United States Patent [19]
Fischer

[11] Patent Number: 6,021,200
[45] Date of Patent: Feb. 1, 2000

[54] SYSTEM FOR THE ANONYMOUS COUNTING OF INFORMATION ITEMS FOR STATISTICAL PURPOSES, ESPECIALLY IN RESPECT OF OPERATIONS IN ELECTRONIC VOTING OR IN PERIODIC SURVEYS OF CONSUMPTION

[75] Inventor: Jean-Bernard Fischer, Rennes, France

[73] Assignee: Thomson multimedia S.A., Courbevoie, France

[21] Appl. No.: 08/703,596

[22] Filed: Aug. 23, 1996

[30] Foreign Application Priority Data

Sep. 15, 1995 [FR] France .................................. 95 10841

[51] Int. Cl.[7] ....................................................... H04L 9/00
[52] U.S. Cl. ................................. 380/23; 380/4; 380/30
[58] Field of Search ................................. 380/23, 4, 25, 380/30

[56] References Cited

U.S. PATENT DOCUMENTS

| | | | |
|---|---|---|---|
| 5,218,528 | 6/1993 | Wise et al. | 364/409 |
| 5,495,532 | 2/1996 | Kilian et al. | 380/30 |
| 5,682,428 | 10/1997 | Johnson | 380/23 |
| 5,682,430 | 10/1997 | Kilian et al. | 380/30 |

FOREIGN PATENT DOCUMENTS 92 03805  3/1992  WIPO .

OTHER PUBLICATIONS

Electronics Letters, vol. 27, No. 11, May 23, 1991, Stevenage, GB pp. 955–957, XP000232446, Slessenger "Socially Secure Cryptographic Election Scheme" p. 956, col. 1, line 29, co. 2, line 69.

Computers & Security Int'l Journal Devoted to the Study of Technical & Financial Aspects of Computer Security, vol. 10, No. 6, 1991, Amsterdam NL, p. 553–559, XP000264766 Nurmi: "Secret Ballot Elections In Computer Networks", pp. 555, col. 2, line 4, p. 557, col. 1, line 4.

Electronics & Communications in Japan, Part 1—Communications, vol. 68, No. 12, 1985, Silver Spring, Maryland p. 7–16, XP002004608, Akiyama Secret Ballot Systems Using Cryptography.

*Primary Examiner*—David Cain
*Attorney, Agent, or Firm*—Joseph S. Tripoli; Frederick A. Wein; Robert D. Shedd

[57] ABSTRACT

The system includes a plurality of decision units, at least one verification unit, and at least one counting unit, the units being functionally and structurally separate from each other. Each decision unit includes means for producing a source information item and an identity information item, and means for enciphering this source information item in such a way as to render it essentially indecipherable by the verification unit but decipherable by the counting unit. The verification unit includes a file which includes the identities of the decision units, means for checking the identity of the decision unit from which an incoming message originates, and means for compiling an anonymous derived message which is essentially devoid of any identity information item decipherable by the counting unit. The counting unit includes means for receiving the derived messages from the verification unit, means for processing these messages to compile a statistic of the corresponding source information items, and generating a file of the statistics thus compiled.

8 Claims, 1 Drawing Sheet

SYSTEM FOR THE ANONYMOUS COUNTING OF INFORMATION ITEMS FOR STATISTICAL PURPOSES, ESPECIALLY IN RESPECT OF OPERATIONS IN ELECTRONIC VOTING OR IN PERIODIC SURVEYS OF CONSUMPTION

BACKGROUND

The invention relates to a system for the anonymous counting of information items for statistical purposes, enabling the anonymity of the processed information to be preserved in an assured manner with regard to unauthorized persons.

A first application of such a system, as will be seen later, relates to statistical counting, most particularly systems for remote "electronic voting".

In these systems, it is often desirable and even indispensable to preserve the anonymous nature of the voting (the principle of voting by "secret ballot"), whilst being able to verify the identity of a voter in such a way as to prevent any falsification of identity or multiple voting. Moreover, it is necessary to indicate to the voter that his vote has actually been taken into account, this aspect being particularly important in the case of remote voting since difficulties of transmission or of processing may arise without the voter being able to detect them himself. Another possible application relates to systems for the remote surveying of consumption by means of a canvassing system installed at the user's premises.

In this case it is indispensable to preserve a degree of confidentiality so as to preclude the possibility that the information relating to the user, who is necessarily identified (for verification purposes) during transmission of the information, can be hijacked in order to obtain information about the habits, private life, etc. of the person from whom this information originates.

SUMMARY OF THE INVENTION

The basic idea of the present invention consists in splitting, between two functionally and structurally separate units, the functions of verifying the identity and authenticity of the source of information, on the one hand, from the functions for using this information, on the other hand, with secure exchange of data between the various units involved in the transaction (especially by encipherment, acknowledgements of receipt, electronic signature and similar means, which are in themselves known).

In this way, the user unit (which will be referred to hereafter as the "counting unit") will process anonymous information, the authenticity and consistency of which, however, will be certain.

On the other hand, the other unit (which will be referred to hereafter as the "verification unit") will provide for the checking of the information received from the voter or from the consumer (which will be referred to as the "decision unit" herafter) in a nominative manner but without knowing the contents of the source information or operating any count or aggregate.

Of course, in order to preclude any pirating of the data at the level of the links between the decision, verification and counting units, the transmissions will advantageously be encipherable, especially by known techniques such as public key cryptography, which nowadays can be implemented with simple means such as microprocessors integrated into smart cards.

More precisely, the system according to the invention is characterized:

in that it includes a plurality of decision units, at least one verification unit and at least one counting unit, these units being functionally and structurally separate and in that each decision unit includes:

means for producing a source information item to be counted and an identity information item singling out the decision unit, and means for enciphering the source information item in such a way as to render it essentially indecipherable by the verification unit and decipherable by the counting unit, in that the verification unit includes:

a file of the identities of the decision units, means for checking, on receiving an incoming message, the identity of the decision unit from which this incoming message originates, and means for compiling a derived message on the basis of this incoming message, this derived message being an anonymous message essentially devoid of any identity information item decipherable by the counting unit, in that the counting unit includes:

means for receiving the derived messages from the verification unit and for processing these messages in such a way as to compile a statistic of the corresponding source information items, and a file of the statistics thus compiled.

According to a number of advantageous subsidiary characteristics of the present invention:

the means for enciphering the source information item of the decision unit are public key enciphering means operating on the basis of the public key of the counting unit;

the verification unit furthermore includes means for sending back to the decision unit an acknowledgement of receipt message after checking that the identity of this decision unit is consistent in the latter case, the verification unit furthermore advantageously includes means for enciphering the acknowledgement of receipt message, these means being public key enciphering means operating on the basis of the public key of the decision unit, this key being stored in the file of the identities of the decision units;

the counting unit furthermore includes means for sending back to the verification unit an acknowledgement of receipt message after receipt and processing of the corresponding derived message;

the messages exchanged between the decision units, the verification unit and the counting unit include, in respect of at least some of them, a digital signature and the unit receiving such a message includes means for verifying the corresponding signature;

the decision unit furthermore includes means for enciphering the identity information item, these means being public key enciphering means operating on the basis of the public key of the verification unit;

the decision unit is a telematic terminal cooperating with a microcircuit card particular to a given user and insertable into a reader of this terminal;

the verification unit is a computing device and the counting unit is a microcircuit card insertable into a reader of this computing device.

Other characteristics and advantages of the invention will emerge on reading the detailed description below of two examples of the implementation of the invention, these examples being of course merely of an illustrative and non-limiting nature.

BRIEF DESCRIPTION OF THE DRAWING(S)

First implementation of the invention: remote secure electronic voting system.

DESCRIPTION OF THE PREFERRED EMBODIMENT

Figure 1:
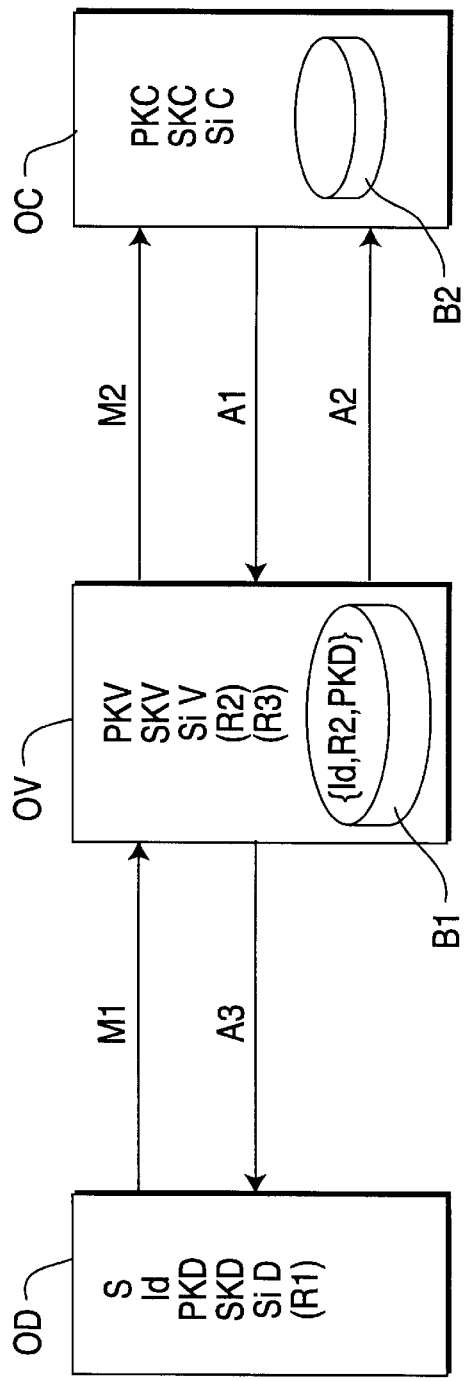
FIG. 1 illustrates schematically a first implementation of the invention, applied to a remote secure electronic voting system.

Schematized as DU in FIG. 1 is the decision unit consisting of an electronic system such as a telematic terminal (for example a videotex terminal, a microcomputer or a dedicated terminal), preferably associated with a smart card individual to the user and constituting an electronic "elector card" capable of storing, with the desired degree of security, the information required for the transaction which will be explained further below.

The reference VU designates the verification unit, which may consist especially of a distant computing centre connected by a telematic link to the decision unit DU.

As a variant, especially in the case of a restricted number of information items to be counted (small number of voters), the verification unit VU may consist of a microprocessor smart card inserted into an appropriate reader, once the memory capacity of the microchip is sufficient.

The counting unit CU, which will aggregate and store the statistical data (that is to say the results of the voting in the particular case of an electronic voting system), is a processing unit which is functionally and structurally separate from the verification unit VU.

This counting unit CU can be a computing centre connected to the computing centre of the verification unit VU but, advantageously, it may also be a straightforward microprocessor smart card inserted into a reader of the verification unit VU during the period of the recording of votes.

Once the counting operation is completed (after the poll has closed in the case of voting), by survey the memory of the counting unit CU (for example the corresponding smart card) it will be possible to know the final result directly, while being certain of its authenticity but without it being possible to ascertain the identity of the voters, this not having been forwarded to this counting unit; furthermore, this way of proceeding prevents any dynamic observation of the movement of the results.

In the preferential case in which smart cards are used for the decision unit DU, the counting unit CU, and, possibly, the verification unit VU, because of the portable nature of these smart cards, the system can be physically embodied in the form, on the one hand, of a first apparatus serving to gather the votes and cooperating with the two (or three) smart cards and, on the other hand, of another apparatus making it possible to present the results, this latter apparatus being separate from the former apparatus and therefore presenting no possibility of pirating or falsification.

The manner in which the transaction is performed will now be described, taking the example of a source information item S compiled at the level of the decision unit DU and consisting of a vote sent by a voter whose identity is Id.

It will be supposed that the decision unit DU, verification unit VU and counting unit CU each employ a public enciphering key, PKD, PKV and PKC respectively, which is known to the other units of the system, and also a secret deciphering key, SKD, SKV and SKC respectively, which is known only to the corresponding unit and is the counterpart of the respective public keys PKD, PKV and PKC.

These three units also employ respective digital signatures SiD, SiV and SiC making it possible to implement a digital signature mechanism with the public key cryptosystem (the secret deciphering algorithm being used as signature algorithm and the public enciphering algorithm serving for the verification of the corresponding signatures).

The basic idea consists in concealing (via a public key enciphering system) the vote sent by the decision unit DU from the verification unit VU, but not from the counting unit CU, and in allowing the verification unit VU to delete the identity information from the message sent by the decision unit DU before transmission to the counting unit CU.

The decision unit enciphers the source information item (the vote) S and a random data item R1 with the public key PKC of the counting unit, this yielding a result:

$$X1 = PKC\ (S, R1) \quad (1)$$

The decision unit next enciphers this result X1 with its individual data item Id, for example its identity or the certificate of its signature (the principles of public key cryptography, authentication mechanisms and digital signatures are, as indicated earlier, known techniques which will therefore not be re-explained in detail).

This encipherment is performed with the public key PKV of the verification unit, this yielding a result:

$$X2 = PKV\ (X1, Id) \quad (2)$$

Finally, the decision unit DU signs the message X2 by means of its signature SiD, yielding a final message:

$$M1 = SiD\ (X2) = SiD\ (PKV\ (PKC(SnR1), Id)) \quad (3)$$

This message M1 is despatched to the verification unit VU.

The verification unit begins by deciphering M1 so as to obtain the message X1 and Id by means of its secret key SKV, and verifies the signature of X2 by means of the signature associated with Id.

In the event of consistency, the verification unit enters the voter into its database B1 after having verified that this voter has not already voted.

It then associates the identity Id with a random data item R2, individual to the voter and stored in the database B1 alongside the identity Id.

The verification unit then forms a message consisting of the signature of X1 and of R2 by means of its individual signature SiV, i.e.:

$$M2 = SiV\ (X1, R2) = SiV\ (PKC\ (S, R1), R2) \quad (4)$$

This message M2 is despatched to the counting unit CU. As may be observed, it contains no indication liable to reveal the identity of the voter, since the data item R2 associated with this identity is a random data item which is meaningless to anyone not possessing the file B1.

In the event that the voter had already been recorded in the database of the file B1, and that the message A3 (see further below) had already been returned to the decision unit, the verification unit, at this stage, again despatches a message A3 without transmitting anything to the counting unit CU.

On receiving the message M2, the counting unit CU verifies the signature and deciphers the message X1 so as to obtain the value S, this decipherment being performed by means of the secret key SKC individual to the counting unit.

The source information item S (the vote) is then counted into the database B2 of the counting unit which, as may be seen, has no knowledge of the identity of the voters nor any means of retrieving this identity from the information exchanged or stored.

The counting unit CU then acknowledges receipt of the information item and confirms proper execution of the count by signing the two random data items R1 and R2 with the signature SiC, yielding a message (first acknowledgement of receipt):

$$A1 = SiC\ (R1, R2) \tag{5}$$

The verification unit VU receives the message A1, verifies its signature and acknowledges receipt of this message by sending back to the counting unit CU a confirmation message (second acknowledgement of receipt):

$$A2 = SiV\ (R1) \tag{6}$$

On receipt of this confirmation message A2, the counting unit CU, after having verified the signature, erases R1 from the database B2.

As may be seen, this database can consist of a file of relatively restricted size insofar as it contains, in addition to statistical results, only the messages in progress, receipt of which has not yet been acknowledged.

Next, the verification unit VU explores its database B1 to find the identity Id corresponding to the random data item R2, and records R1. It then enciphers R1 and another random data item R3 by means of the public key PKD of the decision unit, yielding a confirmation message (third acknowledgement of receipt):

$$A3 = PKD\ (R1, R3) \tag{7}$$

The decision unit DU, on receipt of the message A3, deciphers the latter by means of its individual secret key SKD and compares the random value R1 obtained after deciphering the message A3 with the value R1 which it had itself generated at the time that the source information item S was produced, and which had enabled the message M1 to be compiled.

The agreement of the two values thus compared indicates with certainty that the source data item S has been correctly transmitted and processed consistently, and that such has indeed been the case in all the steps of the process.

The system just described is capable of detecting any possible loss of message (following, for example, a transmission fault) because all the messages sent are the subject of a return acknowledgement of receipt.

Generally, after a predetermined period, if the acknowledgement of receipt message A1, A2 or A3 is not received by the unit which expects to receive it, this unit resends the same message, receipt of which ought to have been acknowledged.

The various possibilities of loss of message (or impairment of the message) and the way in which the system may remedy this will be examined below:

loss of the message M1: the decision unit resends M1; as this message is the first to arrive at the verification unit VU, the latter processes it in the manner indicated earlier loss of the message A3: the decision unit resends the message M1 but, unlike the previous case, the identity of the voter has already been loaded into the database B1; if the message A3 had already been sent by the verification unit VU, the latter resends it, otherwise the message is ignored (such is the case when the message A1 has not yet been received).

loss of the message M2: the verification unit VU resends M2; as this message is regarded by the counting unit CU as being the first, the procedure continues normally.

loss of the message A1: in this case, the verification unit VU resends M2 but, as the corresponding message has already been the subject of a loading into the database B2 of the counting unit CU, the latter does not modify the corresponding heading of the file and merely resends the acknowledgement of receipt A1 loss of the message A2: in this case, the counting unit CU resends the message A1; as the verification unit VU, after crosschecking from its database, notes that the corresponding message M2 has already been sent, it will then merely resend the acknowledgement of receipt A2 to the counting unit CU.

In addition to the possibility of remedying any loss of information during transmission, the system has the major advantage of maximum security as regards the anonymous nature of the voting, the verifying of the identity of the voter and the preventing of any falsification of identity or double voting.

Thus:

the anonymous nature of the voting is ensured since anybody who might be able to pick up the information travelling over the various transmission channels could not associate a vote with the corresponding voter, unless able to break the codes, this presupposing that he knows the three secret keys SKD, SKV and SKC. Furthermore, it will be noted in this respect that neither the verification unit VU nor the counting unit CU are capable of successfully accomplishing such an operation, insofar as they know only a part of the codes and are not able to discover the other part thereof.

the voter is certain that his vote has indeed been taken into account, since the only unit capable of deciphering the random data item R1, which is associated with the vote, is the counting unit CU.

the verification unit VU makes it possible to filter out double votes or unauthorized votes (by virtue of a non-consistent identity).

the system is sheltered from any loss of message in the course of transmission, which losses can be detected at the various stages of the transaction and can be remedied appropriately.

Second implementation of the invention: remote secure statistical consumption survey system.

Figure 2:
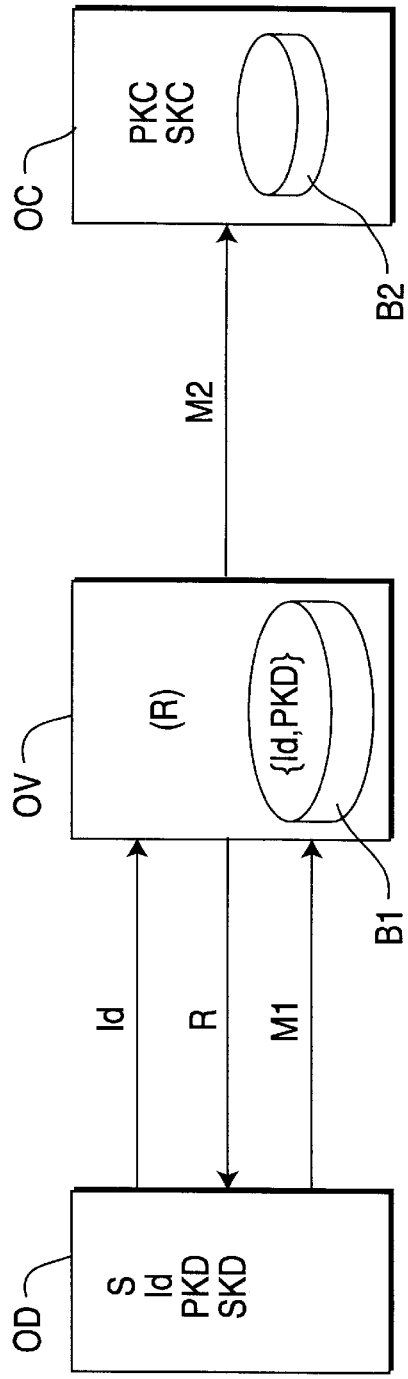
FIG. 2 illustrates schematically a second implementation of the invention, applied to a remote secure statistical consumption survey system.

FIG. 2 illustrates a second implementation of the process of the invention, effected in a somewhat simplified form as compared with the previous implementation.

This second implementation is particularly appropriate to a consumption survey system for statistical purposes. An example of such a survey is that used by the providers of television programmes by means of a canvassing system which is installed at the listener's premises and can be connected up to the provider's computing server centre to inform him of the programmes listened to, thus making it possible to produce accurate statistics.

In such an example, it would be possible to imagine the system being hijacked to obtain information about the private life of the consumer. Thus, in currently implemented techniques the customer is overtly identified when he calls (this identification being necessary so that the statistics are not corrupted by pirate declarations). However, identifying the customer provides a knowledge of his habits, for example a knowledge of the times for which he is absent, or can serve to create a file of the people watching a particular programme, etc., in other words to intrude into the private life of the listener.

As in the first implementation, the system used in this second implementation, illustrated in FIG. 2, includes a decision unit DU, a verification unit VU and a counting unit CU which are functionally and structurally separate from one another.

The decision unit DU produces a source information item S (the survey of consumption, uncoded), is singled out by an identifier Id and possesses individual public and secret keys PKD and SKD, respectively, to allow the enciphering of the information exchanged.

This decision unit DU can, for example, be a canvassing system which is connected to a television in order to produce the source data item S and receives a smart card individual to the user, making it possible to store and manage the identifier and the enciphering keys and algorithms.

This decision unit DU is connected by a telematic link to a verification unit VU, for example the computing centre of the television programme provider or of a body given the job of compiling the requested statistic.

This verification unit VU contains a database B1 built from the file of the users who will form the subject of the survey. The verification unit VU is in turn connected to a counting unit CU, which may advantageously be a smart card inserted into a reader of the verification unit VU.

This counting unit CU possesses a database B2 formed from the file of statistical results, which file may be of restricted size insofar as only the final results are retained. Once the surveys of consumption have been performed at the premises of all the users, the smart card may be extricated from the verification unit VU and read by a separate apparatus, with the certainty that the statistics which have been built up therein have been the subject of a verification of identity, but without it being possible to ascertain this identity.

The manner in which the transaction is performed will now be described.

The decision unit DU (canvassing system installed at the customer's premises) prepares the survey of consumption S and enciphers this information item with the public key PKC of the counting unit CU, thus yielding an information item PKC(S) which can be deciphered by the counting unit CU by means of its secret key SKC, and therefore by it alone.

Before transmitting this information item PKC(S), the decision unit DU will firstly identify itself to the verification unit VU by transmitting its identity Id thereto.

The verification unit VU will then search through its database B1 for the information relating to this identity and verify that it is indeed a recorded customer, that the latter has not already sent his survey, that he is or is not one of a selection of customers to be taken into account, etc. Additionally, it retrieves the public key PKD corresponding to this particular customer.

The verification unit VU then sends back a random value R to the decision unit DU, a value which it will have generated if the preliminary verifications indicate the consistency of the various parameters emanating from the decision unit DU.

On receipt of this random data item R, the decision unit DU produces an enciphered message on the basis of this value R and of the data item PKC(S) (representative of its consumption):

$$M1 = SKD\ (R,\ PKC(S)). \tag{8}$$

This message M1, despatched to the verification unit VU, is deciphered by the latter by means of the corresponding public key PKD retained in memory in the database B1. It then updates this database, for example by indicating, for subsequent checking, the day and time of forwarding the survey (especially to preclude a survey being transmitted twice), and forwards the information item PKC(S) obtained by decoding the message M1 to the counting unit CU, in the form of a message:

$$M2 = PKC(S). \tag{9}$$

On receipt of M2, the counting unit CU will be able to extract the consumption information item S therefrom by decipherment by means of its secret key SKC, and count the survey.

Just as in the previous implementation, it may be seen that all of the data exchanges are secure, and that it is not possible overtly to ascertain both the identity of the customer and his consumption, the unit which processes the identity (the verification unit VU) being unable to decipher the survey and the unit for processing the survey (the counting unit CU) receiving an information item which, although verified, bears no clue as to the identity of the sender.

I claim:

1. A system for the anonymous counting of information items for statistical purposes, especially in respect of operations in electronic voting or in periodic surveys of consumption, comprising:

a plurality of decision units, at least one verification unit and at least one counting unit, these units being functionally and structurally separate each decision unit including means for producing a source information item to be counted and an identity information item singling out of the decision unit, means for enciphering the source information item to render the source information item essentially indecipherable by the verification unit and decipherable by the counting unit, the verification unit including a file of the identity information of the decision units, means for checking, upon receiving an incoming message, the identity of the decision unit from which this incoming message originates, means for compiling a derived message on the basis of this incoming message, the derived message being an anonymous message essentially devoid of any identity information item decipherable by the counting unit, the counting unit including means for receiving the derived messages from the verification unit and for processing these messages to compile a statistic of the corresponding source information items, a file of the statistics being thus compiled, and the means for enciphering the source information item of the decision unit are public key enciphering means operating on the basis of the public key of the counting unit.

2. The system of claim 1, wherein the verification unit furthermore includes means for sending back to the decision unit an acknowledgment of receipt message after checking that the identity of this decision unit is consistent.

3. The system of claim 2, wherein the verification unit furthermore includes means for enciphering the acknowledgment of the receipt message and being public key enciphering means operating on the basis of the public key of the decision unit, this key being stored in the file of the identities of the decision units.

4. The system of claim 1, wherein the counting unit furthermore includes means for sending back to the verification unit an acknowledgment of the receipt message after receipt and processing of the corresponding derived message.

5. The system of claim 1, wherein messages exchanged between the decision units, the verification unit and the counting unit include, in at least some of them, a digital signature and the unit receiving such a message includes means for verifying the corresponding signature.

6. The system of claim 1, wherein the decision unit furthermore includes means for enciphering the identity information item, these means being public key enciphering means operating on the basis of the public key of the verification unit.

7. The system of claim 1, wherein the decision unit is a telematic terminal cooperating with a microcircuit card particular to a given user and insertable into a reader of this terminal.

8. The system of claim 1, wherein the verification unit is a computing device and the counting unit is a microcircuit card insertable into a reader of this computing device.

* * * * *